US008924855B2

(12) United States Patent
Hofrichter

(10) Patent No.: US 8,924,855 B2
(45) Date of Patent: Dec. 30, 2014

(54) RETAIL OUTLET TV FEATURE DISPLAY SYSTEM

(75) Inventor: Klaus Hofrichter, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1746 days.

(21) Appl. No.: 12/142,158

(22) Filed: Jun. 19, 2008

(65) Prior Publication Data

US 2009/0320062 A1    Dec. 24, 2009

(51) Int. Cl.
*G06F 3/00*      (2006.01)
*H04N 7/025*     (2006.01)
*H04N 5/445*     (2011.01)
*H04N 21/431*    (2011.01)
*H04N 21/488*    (2011.01)

(52) U.S. Cl.
CPC ......... *H04N 5/44513* (2013.01); *H04N 21/431* (2013.01); *H04N 21/4882* (2013.01)
USPC ........... 715/730; 715/715; 715/716; 715/717; 725/32

(58) Field of Classification Search
USPC .............................. 715/717, 715, 716; 725/32
See application file for complete search history.

(56) References Cited

U.S. PATENT DOCUMENTS

2009/0153736 A1*  6/2009  Mortensen ..................... 348/569
2009/0158314 A1*  6/2009  Flynn .............................. 725/32

OTHER PUBLICATIONS

Stuart Miles CES 2007: Samsung sees connectivity as key to new TV range Jan. 8, 2007 1 page.*
Federal Communications Commision Requirements for Digital Television Receiving Capability Released Nov. 8, 2005 18 pages.*
WireSpring Technologies, Inc Point-of-Purchase/POP Displays How digital retailing technologies are creating new in-store display options. Retrieved by archive.org dated Oct. 12, 2007 2 pages.*

* cited by examiner

*Primary Examiner* — Andrea Long
(74) *Attorney, Agent, or Firm* — John L. Rogitz

(57) ABSTRACT

An automatic feature demonstration mode for TV products that can be used in retail stores. TV features that otherwise would be overlooked by customers or misrepresented by the sales staff are advertised on the TV itself. The system may be used to convey information beyond TV features.

7 Claims, 2 Drawing Sheets

RETAIL OUTLET TV FEATURE DISPLAY SYSTEM

FIELD OF THE INVENTION

The present invention relates generally to presenting information regarding a TV's features on the TV display itself in a retail establishment.

BACKGROUND OF THE INVENTION

TVs in a retail location typically are energized side by side to show the same video (such as from a TV station) so that customers can compare the video quality and cosmetic design between different TV models and brands. To provide the customers further information regarding particular TV features, posters or cards are mounted near the TV to explain the TV features, since the features themselves are not easily visible to the customer. Such features include, e.g., the presence of an electronic program guide (EPG), ease of use of the TV's graphical user interface (GUI), etc.

As understood herein, advertising features using cards or posters might not always be effective, because customers spend most of their attention on the TV display itself. Furthermore, the advertising may not be completely controlled by the TV manufacturer. For instance, the placement of the advertising is controlled by the retail outlet, and a poster or card for a TV might mistakenly be placed near the wrong TV, meaning that the manufacturer might not be able to control errors the creep in to the advertising.

SUMMARY OF THE INVENTION

Embodiments herein address the above situation by adding an automatic presentation of device features that are displayed on the TV itself, typically simultaneously with a video presentation.

Accordingly, a TV system includes a TV display and a processor automatically presenting, in a loop, a sequence of feature presentations on the display advertising respective features of the TV. The features may include, without limitation, an electronic program guide, a photo slideshow, a user interface feature, or a connectivity feature. The feature presentation may include a banner carrying the title of the feature.

If desired, the sequence of feature presentations can be presented on the TV display simultaneously with video that is not related to the feature presentation. The processor can disable feature presentation in response to, e.g., a user entering a setup mode of the TV, a user pressing any key on the TV, etc.

In another aspect, a TV system includes a TV display, a TV tuner configured to receive TV signals for presentation on the display, and a processor communicating with the display to send feature presentation images thereto in a loop automatically while the TV is energized in a retail outlet. In this way, consumers can view the display to learn what features are possessed by the TV.

In still another aspect, a method includes loading, onto a digital storage medium associated with a TV, a script executable by a processor in the TV. The method also includes loading, onto the medium, content related to features possessed by the TV Also, the method includes, when the TV is energized in a retail outlet, causing the processor under control of the script to display the content on the TV.

Retailer customization of the displayed features maybe provided for. Retailers maybe permitted to add their own individual content, e.g., logos, current special offer, other promotions, etc. to the feature content. This may be done by adding the individual extra content to, e.g., the existing script on the digital storage medium such as a USB memory stick or through a network server using software tools such as but not limited to PC-based tools, web-based applications, etc.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
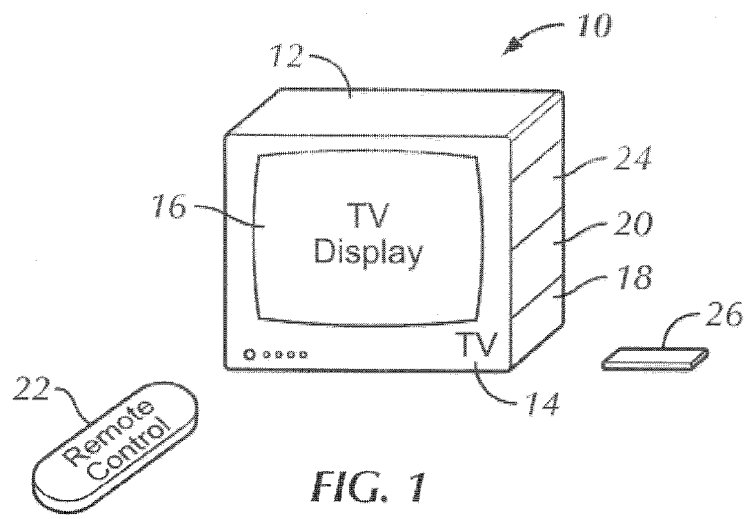
FIG. 1 is a non-limiting block diagram of a system in accordance with present principles, schematically showing internal components of the TV.

Referring initially to FIG. 1, a system is shown, generally designated 10, which includes a television 12defining a TV chassis 14and a TV display 16on the chassis 14. The TV 12also includes a TV processor 18and tangible computer readable storage medium 20in the chassis 14. The tangible computer readable medium 20may be established by, without limitation, solid state storage, optical or hard disk storage, etc. The tangible computer readable media herein may store software executable by one or more of the processors to, e.g., control a display driver that drives the TV display 16. The display 16may be a flat panel matrix display, cathode ray tube, or other appropriate video display. The medium 20may also contain additional code including 3D graphics software executable by the TV processor 18The TV processor 18may execute the logic below, which may be stored as computer code on one or more the computer readable media described herein. A wireless remote control device 22may also be provided to send commands to the processor 18to, among other things, select a channel to which a TV tuner 24should tune. A memory module 26such as a Sony Memory Stick™ may be removably engaged with the TV 12to exchange information with the TV processor 18.

Figure 2:
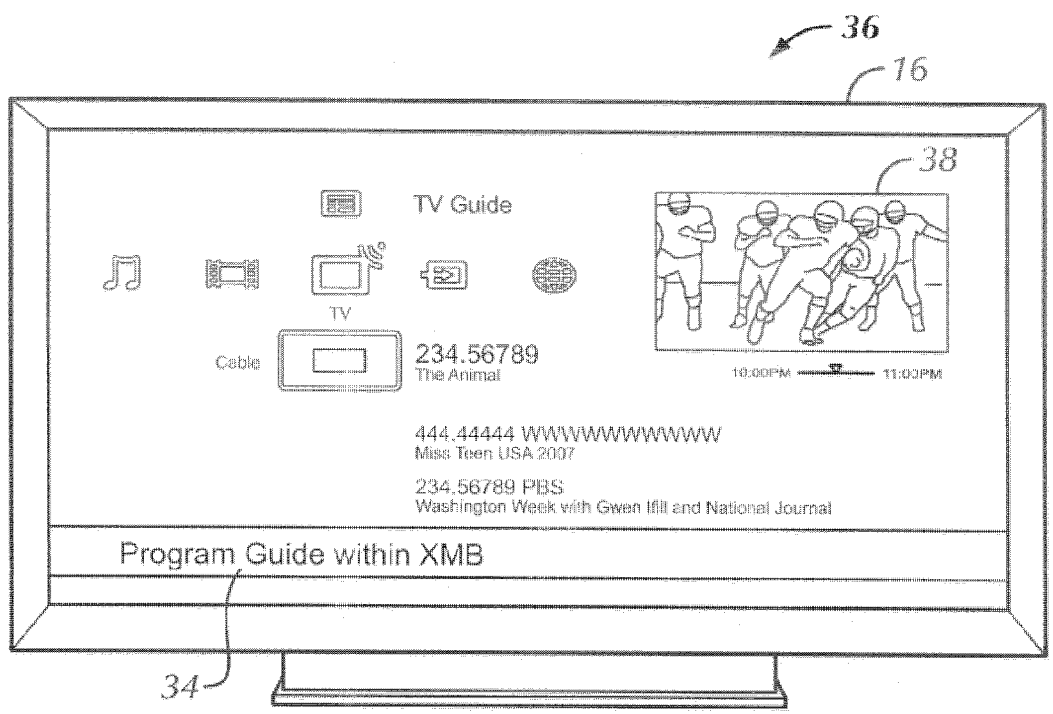
FIG. 2 is a non-limiting screen shot showing an embodiment of present principles.
Figure 3:
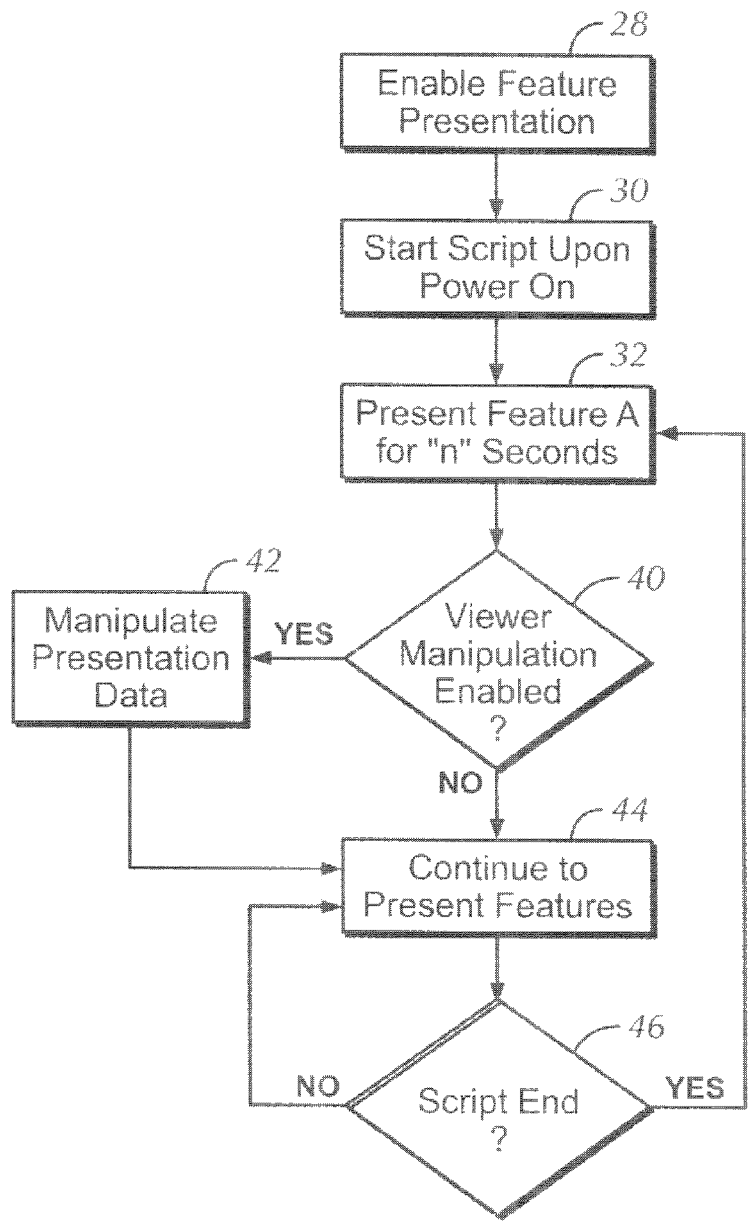
FIG. 3 is a flow chart of example logic according to present principles.

Now referring to FIGS. 2 and 3, as shown in FIG. 2 and indicated at block 28in FIG. 3 the feature presentation capability of the TV 12in accordance with present principles is enabled. The feature presentation can be enabled by factory default, or by the retailer. In one implementation, the presentation can be driven by a script which automatically starts when the TV is powered on in the retail location and thus in this implementation relies on no external infrastructure, because the script is loaded onto the memory module 20. However, other embodiments can integrate external infrastructure such as an Internet connection, home network or the memory module 26to input the script to the TV processor 18.

In any case, at block 30the TV processor 18commences the script upon power on in the retail location. The TV processor 18may be programmed to recognize initial power on as energization occurring in a store, or it may regard any power on as a trigger to start the script until the script is disabled as described below.

At block 32, the first feature in the script (referred to as feature "A" in FIG. 3) is presented. As indicated at 32in FIG. 2, the first feature presentation may include, e.g., a banner 34 carrying the title of the feature (in the example shown, "Program Guide with XMB" standing for "cross-menu bar"). As generally indicated at 36 in FIG. 2, the content of the feature presentation may also include the feature itself in this case, icons representing content sources and alpha-numeric indications of the content supplied from the sources as shown. In general, the feature presentation may include pictures, text, video, audio. The content of the feature presentation may be preinstalled on the TV 12 by, e.g., storing it in the medium 20, for access thereof by the processor 18. The content may be updated as desired using the Internet or, e.g., the memory module 26.

As also shown in FIG. 2 at 38, live video from, e.g., a tuned-to TV station may be simultaneously presented on the TV display 16 along with the feature presentation 34, 36. In the embodiment shown the live video 38 is in a picture-in-picture mode in which the live video occupies only part of the display 16, with the feature presentation occupying the remainder of the display. In other implementations the live video may occupy the entire display 18 and the feature presentation overlaid on the live video. In still other implementations only the feature presentation may appear on the display 16.

Returning to FIG. 3, as indicated at block 32 the first feature is presented for a predetermined period of "n" seconds. Additionally or alternatively, if viewer manipulation is provided for at decision diamond 40, a retailer or third party can be provided with tools to manipulate the presentation data at block 42 to include local advertisement (e.g. price information for this model, or rebate/bundle offers). In a further embodiment, such updates can be controlled via an online network and may include real-time data such as weather and traffic information.

Block 44 indicates that additional features are presented as called for by the script in accordance with above principles until the TV processor determines at decision diamond 46 that the script has ended, in which case the process loops back to the start of the script at block 32.

With the above in mind, it may now be appreciated that present principles help make customers in a retail store aware of differentiating TV features that would normally not be displayed. In addition to EPG, these feature may include, without limitation, photo slideshow (in which a viewer is informed of operating a photo slideshow of photos that might be stored in the medium 20), user interface features, connectivity features (e.g., how to connect to the Internet for Internet-enabled TVs), home networking capability, online content access, content download service information, content streaming service information, music playback information, picture quality settings, and soon. The feature presentation advantageously does not depend on retail store setup or interaction if desired, motivating retailers not to disable the scripted presentation mode.

In some embodiments, the above-described automatic launch at power on is disabled when a customer runs "setup" in the home. "Setup" ordinarily is accessed from an initial menu and entry of the setup mode may be used as a signal to the TV processor 18 to disable the script. If desired, a menu entry may be provided in the "setup" mode to reenable the script.

A simple script that may be used may include a list of image content that is to be displayed in a sequence. As described above, the linear presentation may loop indefinitely. A more complex script maybe based on a programming language such as Java, or a presentation format such as Adobe Flash™. This may include interactive features such as permitting the viewer to manipulate the sequence of the presentation.

While the particular RETAIL OUTLET TV FEATURE DISPLAY SYSTEM is herein shown and described in detail, it is to be understood that the subject matter which is encompassed by the present invention is limited only by the claims.

What is claimed is:

1. A system, comprising:
   a display; and
   a processor configured for accessing instructions on a computer medium for configuring the processor for automatically presenting, in a loop, a sequence of feature presentations on the display advertising respective features of the display, the processor configured for accessing instructions on a computer medium for configuring the processor for automatically presenting the loop at power on of the display, the processor configured for accessing, instructions on a computer medium for configuring the processor for presenting an onscreen menu on the display by which a user may disable presentation of the loop, the processor configured for accessing instructions on a computer medium for configuring the processor for also presenting an onscreen menu on the display by which a user may reenable presentation of the loop, wherein the processor is configured for accessing instructions on a computer medium to configure the processor to disable feature presentation in response to a user entering a setup mode of the display.

2. The system of claim 1, wherein a first feature is an electronic program guide.

3. The system of claim 2, wherein a second feature is a photo slideshow.

4. The system of claim 2, wherein a second feature is a user interface feature.

5. The system of claim 2, wherein a second feature includes connectivity features.

6. The system of claim 1, wherein a feature presentation includes a banner carrying the title of the feature.

7. The system of claim 1, wherein the sequence of feature presentations is presented on the display simultaneously with video that is not related to the feature presentation.

* * * * *